(12) United States Patent
Beatty et al.

(10) Patent No.: US 6,938,957 B2
(45) Date of Patent: Sep. 6, 2005

(54) ROTATION LOCK MECHANISM FOR AIRCRAFT SEAT

(75) Inventors: George T. Beatty, Rockford, IL (US); Nathan A. Hemmer, Rockford, IL (US); John H. Traube, Jonesboro, AR (US); Carl R. Hutchison, Rockford, IL (US)

(73) Assignee: DeCrane Aircraft Seating Company, Inc., Peshtigo, WI (US)

( * ) Notice: Subject to any disclaimer, the term of this patent is extended or adjusted under 35 U.S.C. 154(b) by 93 days.

(21) Appl. No.: 10/409,976

(22) Filed: Apr. 7, 2003

(65) Prior Publication Data

US 2004/0195886 A1 Oct. 7, 2004

(51) Int. Cl.⁷ .................................................. A47C 1/06
(52) U.S. Cl. ............................ 297/344.22; 297/344.24; 248/425
(58) Field of Search ....................... 297/344.22, 344.24; 248/425

(56) References Cited

U.S. PATENT DOCUMENTS

| | | | | |
|---|---|---|---|---|
| 3,622,202 A | * | 11/1971 | Brown | ............... 297/344.22 X |
| 3,858,834 A | | 1/1975 | Eimen | |
| 3,926,396 A | | 12/1975 | Hall et al. | |
| 4,097,016 A | | 6/1978 | Petrucci | |
| 4,588,226 A | * | 5/1986 | Young et al. | ........... 297/344.24 |
| 4,671,572 A | * | 6/1987 | Young et al. | ........... 297/344.24 |
| 4,705,256 A | * | 11/1987 | Hofrichter | ......... 297/344.22 X |
| 4,756,502 A | | 7/1988 | Egan | |
| 4,893,871 A | * | 1/1990 | Kowalski | ........... 297/344.22 X |
| 5,292,179 A | | 3/1994 | Forget | |
| 5,568,960 A | * | 10/1996 | Oleson et al. | ......... 297/344.22 |
| 5,634,537 A | | 6/1997 | Thorn | |
| 5,733,006 A | * | 3/1998 | Woods | ................... 297/344.22 |
| 5,762,617 A | | 6/1998 | Infanti | |
| 5,810,441 A | * | 9/1998 | Ezuka et al. | ......... 297/344.22 X |
| 5,904,399 A | * | 5/1999 | Kim et al. | .............. 297/344.22 |
| 5,941,498 A | * | 8/1999 | Hoshihara et al. | .. 297/344.22 X |
| 5,951,106 A | * | 9/1999 | Hirama et al. | ......... 297/344.22 |
| 6,116,183 A | * | 9/2000 | Crow et al. | ......... 297/344.22 X |
| 6,361,111 B1 | * | 3/2002 | Bowers et al. | ......... 297/344.22 |
| 6,536,842 B2 | * | 3/2003 | Bowers et al. | ......... 297/344.22 |

FOREIGN PATENT DOCUMENTS

GB 2273042 A * 6/1994 ............. 297/344.22

* cited by examiner

Primary Examiner—Rodney B. White
(74) Attorney, Agent, or Firm—Blakely, Sokoloff, Taylor & Zafman, LLP

(57) ABSTRACT

A braking mechanism to control rotational movement of a seat is disclosed. The braking mechanism may comprise a circular member (e.g., a disc or ring) that is coupled to a base assembly and a caliper, coupled to a seat assembly, to engage the circular member. In a biased position, a braking element of the caliper applies a braking force to the circular member. A user can reduce the braking force by increasing the tension on a cable coupled to the caliper. Once the braking force is sufficiently reduced, the user may rotate the seat until the desired rotational orientation is attained. Upon release of the cable, the braking mechanism re-engages to prevent further rotational movement.

21 Claims, 5 Drawing Sheets

ROTATION LOCK MECHANISM FOR AIRCRAFT SEAT

FIELD

The embodiments disclosed herein relate generally to brake systems, and more particularly to brake systems for adjustable seats.

BACKGROUND

Many airplanes and recreational vehicles ("RVs") have adjustable seats that can move in several directions. For example, some seats permit a user to move the seat forward and backward, side-to-side, and around a central axis (e.g., rotational motion). For each of these three types of movement, many different systems have been used to control seat positioning.

One system for controlling rotational movement includes using a disc or ring attached to a base assembly, which is attached to the floor of an airplane. The disc or ring includes gear-like teeth disposed along the outer circumference of the disc or ring. A mating gear-like locking mechanism is attached to the seat, which can rotate freely when the user disengages the locking mechanism from the disc or ring. When the user wishes to prevent further rotational movement of the seat, the user engages the locking mechanism, which permits a gear-like tooth to sit between one of the teeth disposed on the disc or ring.

However, the "gear" design has some drawbacks. For example, there are only a finite number of positions in which a user can securely position the seat. Depending on the width of the gear teeth, the angular distance between positions can be significant.

In addition, the seat can get stuck "between" teeth (e.g., locking mechanism not properly engaged between gear teeth). This can cause an undesirable situation in which the user incorrectly believes that the seat is locked. For example, in an airplane, a user holding a hot cup of coffee can be burned if a seat that is improperly "locked" jolts into a proper locked position when the airplane turns at a sharp angle or suddenly experiences turbulence.

SUMMARY

Various embodiments disclosed herein utilize a braking mechanism to control rotational movement of a seat. The braking mechanism may comprise a circular member (e.g., a disc or ring) that is coupled to a base assembly and a caliper, coupled to a seat assembly, to engage the circular member. In a biased position, a braking element of the caliper applies a braking force to the circular member. A user can reduce the braking force by increasing the tension on a cable coupled to the caliper. Once the braking force is sufficiently reduced, the user may rotate the seat until the desired rotational orientation is attained. Upon release of the cable, the braking mechanism re-engages to prevent further rotational movement.

One alternative embodiment employs a band disposed around the circumference of the disc instead of a caliper. This embodiment may also employ a circumferential recess in the disc to ensure that the band remains engaged with the disc in both the biased and unbiased positions.

In another alternative embodiment, a brake shoe assembly is used to apply a braking force to a brake drum. One or more brake shoes may be used to apply the braking force to at least one of an inner and an outer surface of the drum.

DESCRIPTION OF THE DRAWINGS

Various embodiments are illustrated by way of example and not by way of limitation in the figures of the accompanying drawings in which like references indicate similar elements. It should be noted that references to an, one, "the," "other," "alternative," or "various" embodiments in this disclosure are not necessarily to the same embodiment, and such references mean at least one.

DETAILED DESCRIPTION

In the following description, for the purposes of explanation, numerous specific details are set forth in order to provide a thorough understanding of the various embodiments. It will be apparent to one skilled in the art that the embodiments may be practiced without some of these specific details. In other instances, certain structures and devices are omitted or simplified in order to avoid obscuring the details of the various embodiments.

The following description and the accompanying drawings provide examples for the purposes of illustration. However, these examples should not be construed in a limiting sense as they are not intended to provide an exhaustive list of all possible implementations.

Figure 1:
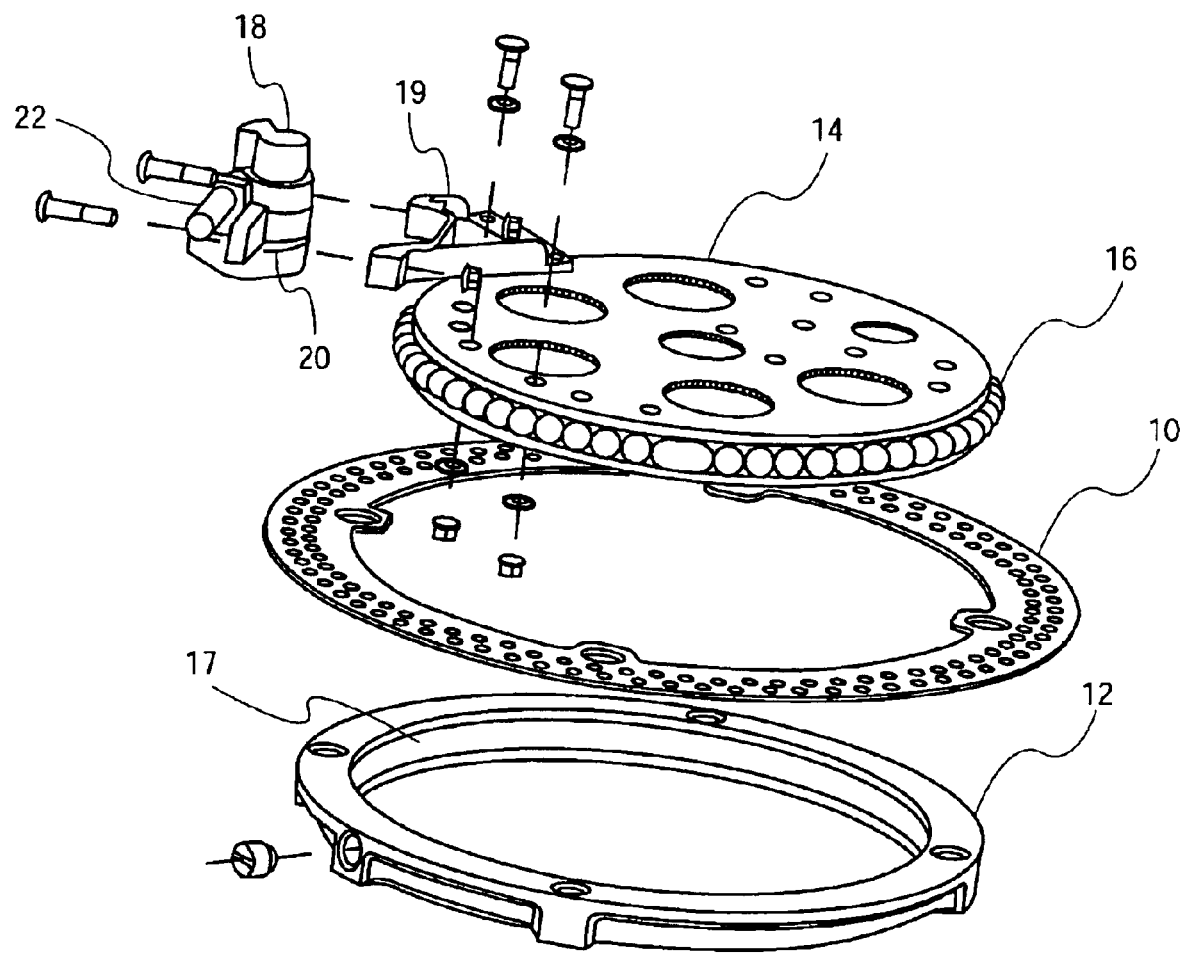
FIG. 1 is an exploded, perspective view of one embodiment of a rotational braking mechanism.

Referring now to FIG. 1, an exploded, perspective view of one embodiment of a rotational braking system is shown. In various embodiments, the braking system comprises a circular member and a braking mechanism to apply a braking force to the circular member. The circular member can be a brake disc (e.g., solid structure) or ring (e.g., a disc with a substantial opening in the central portion of the disc). The circular member shown in FIG. 1 is brake ring 10.

In order to reduce the overall weight of the braking system, a plurality of holes and/or grooves can be formed in the circular member. The holes and grooves may be formed by any suitable technique such as, for example, drilling, milling, or molding.

Figure 2:
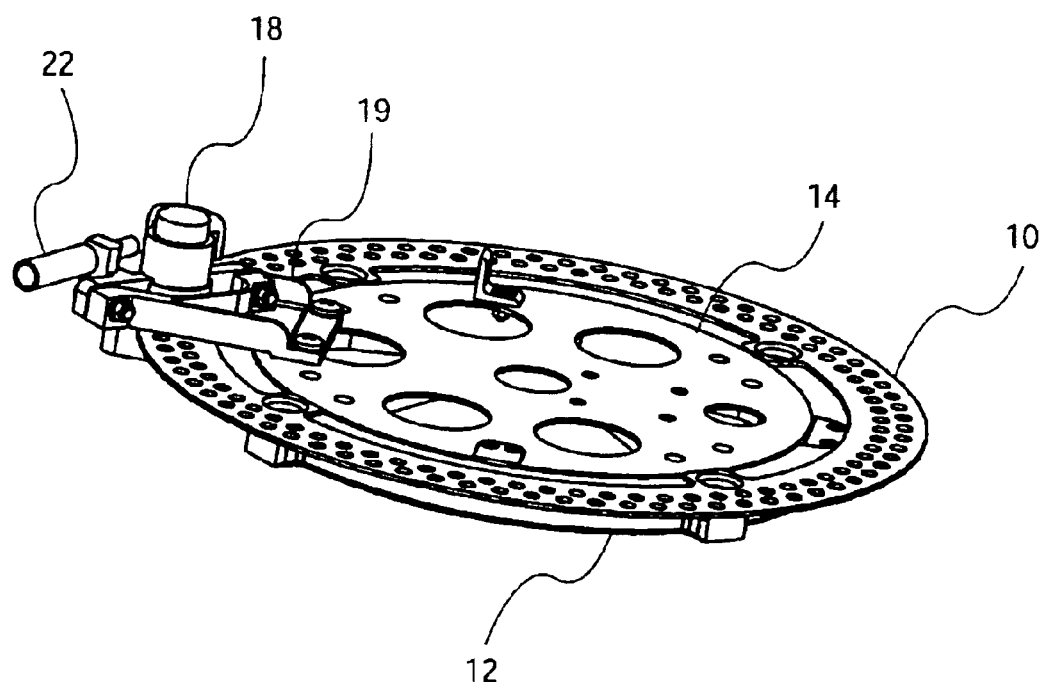
FIG. 2 is an assembled, perspective view of the braking mechanism of FIG. 1.
Figure 3:
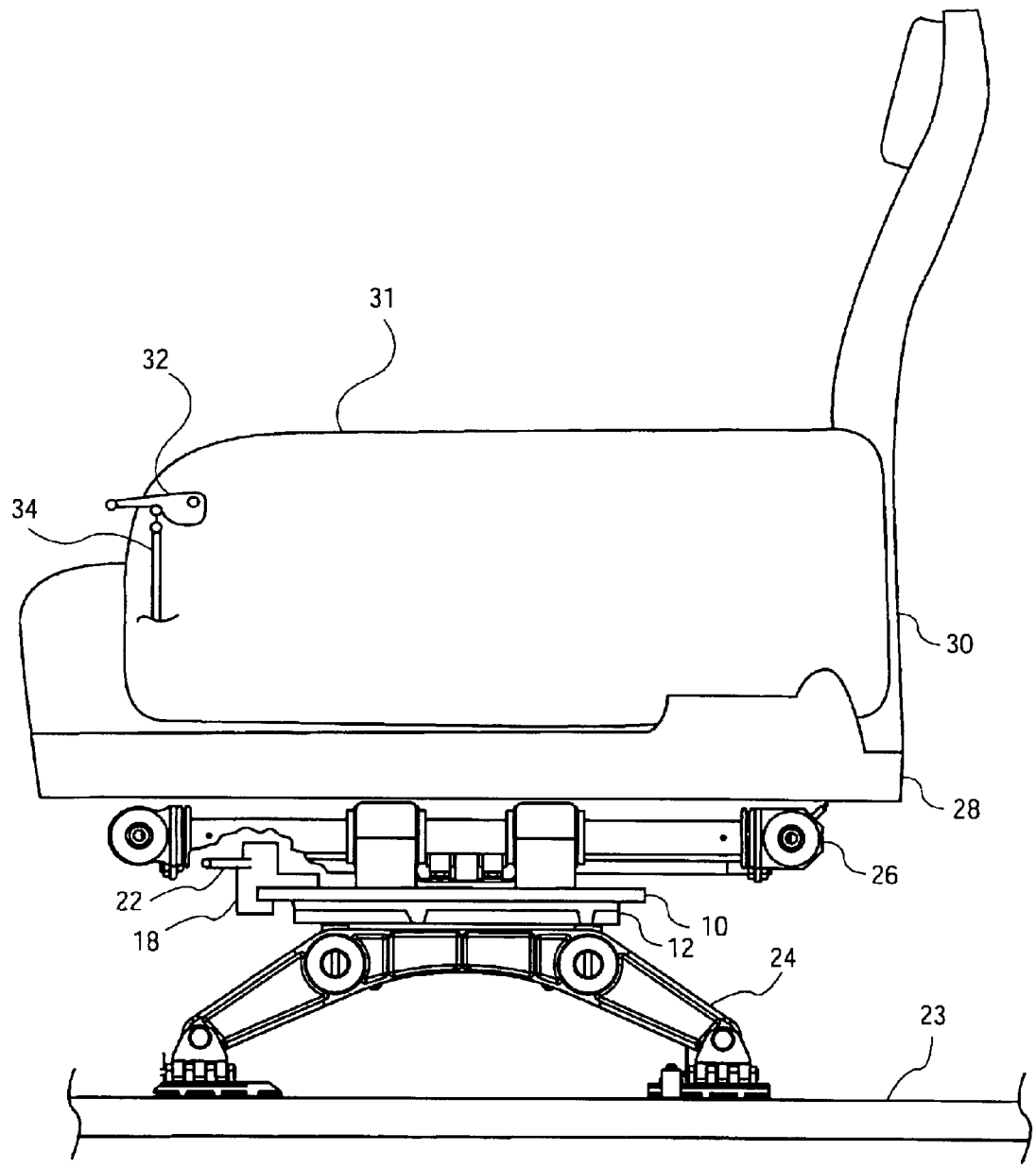
FIG. 3 is a side view of one embodiment of a rotational braking mechanism in combination with a base assembly, a linear bearing track, and a seat assembly.

Once assembled (FIG. 2), brake ring 10 is coupled to swivel ring 12, which is coupled to base assembly 24 (shown in FIG. 3). Inner swivel 14 has bearings 16 (FIG. 1) that can move within track 17 of swivel ring 12. In one embodiment, each bearing 16 only contacts track 17 at two points. For example, each bearing 16 may contact the upper edge of track 17 and the lower edge of track 17. Such a configuration advantageously reduces friction between bearings 16 and track 17 to improve movement of inner swivel 14 relative to swivel ring 12.

Brake housing 18 is coupled to inner swivel 14 by brake bracket 19. This allows brake housing 18 to rotate with inner swivel 14 relative to brake ring 10 and swivel ring 12. In alternative embodiments, brake housing 18 remains stationary while brake ring 10 is capable of rotation.

In one embodiment, brake housing 18 comprises a caliper with opening 20 to receive brake ring 10. The caliper may include a first resilient member (e.g., an internal spring) to bias braking element 40 (FIG. 4) against at least one of a top side and a bottom side of brake ring 10. In this manner, the caliper is capable of applying a braking force to brake ring 10 via braking element 40.

FIG. 3 shows an embodiment in which seat assembly 28 is coupled to inner swivel 14 (e.g., via linear bearing 26) so that seat 30 may be rotated relative to base assembly 24. In the embodiment shown, brake ring 10 remains stationary while inner swivel 14 and seat assembly 28 are capable of rotation.

Figure 4:
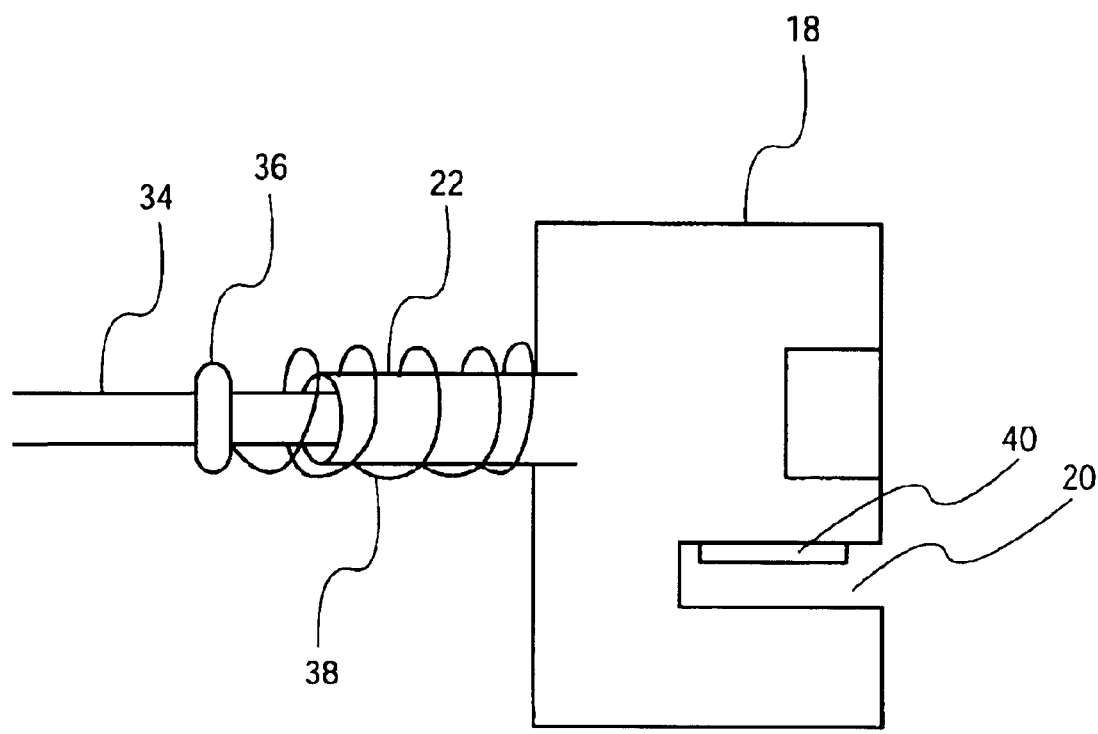
FIG. 4 is a side view of one embodiment of a caliper housing with an external spring to adjust the braking force applied by the caliper in a biased state.

In various embodiments, cable 34 is provided to enable a user to reduce the braking force applied to the circular member (e.g., brake ring 10) such that seat assembly 28 may be rotated. The proximal end of cable 34 may be attached to cable interface 22 of brake housing 18 (FIGS. 3 and 4). The distal end of cable 34 may be attached to brake handle 32 to permit a user to change the tension on cable 34 in order to effect a change in the amount of braking force applied to brake ring 10. Brake handle 32 is coupled to arm rest 31 of seat 30. However, other suitable manners of changing the tension on cable 34 may be used. In addition, the tension adjustment mechanism (e.g., brake handle 32 or suitable alternative) may be disposed in any suitable location.

FIG. 4 shows an embodiment in which cable 34 is coupled (e.g., via cable interface 22) to the caliper to control the amount of braking force applied to brake ring 10. In the embodiment shown, the caliper comprises a resilient member (e.g., a spring disposed within brake housing 18) and braking element 40. The connection between cable 34 and the caliper is such that a change in the tension of cable 34 can release the caliper from a biased position, in which braking element 40 is biased against the circular member disposed within opening 20 of the caliper. Thus, when the tension of cable 34 is increased to overcome the bias of the resilient member, the amount of force exerted on the circular member by braking element 40 is reduced to permit movement of seat assembly 28.

In addition, an adjustable resilient member (e.g., spring 38) can be used to adjust the amount of braking force exerted by the caliper in the biased position on the circular member. In the embodiment shown in FIG. 4, spring 38 is disposed around cable interface 22 and has one end butted against (or coupled to) brake housing 18 and the other end coupled to stop 36. Such a configuration is only one example of a mechanism for adjusting the braking force applied by the caliper in the biased position.

The various embodiments discussed herein are concerned with using a braking force to control the rotational movement of seat 30. As mentioned previously, braking force can also be used to control movement in other directions (e.g., fore and aft movement, as well as transverse). The braking mechanisms used to control movement in the other directions may work on the same or different principles as those disclosed herein.

Figure 5:
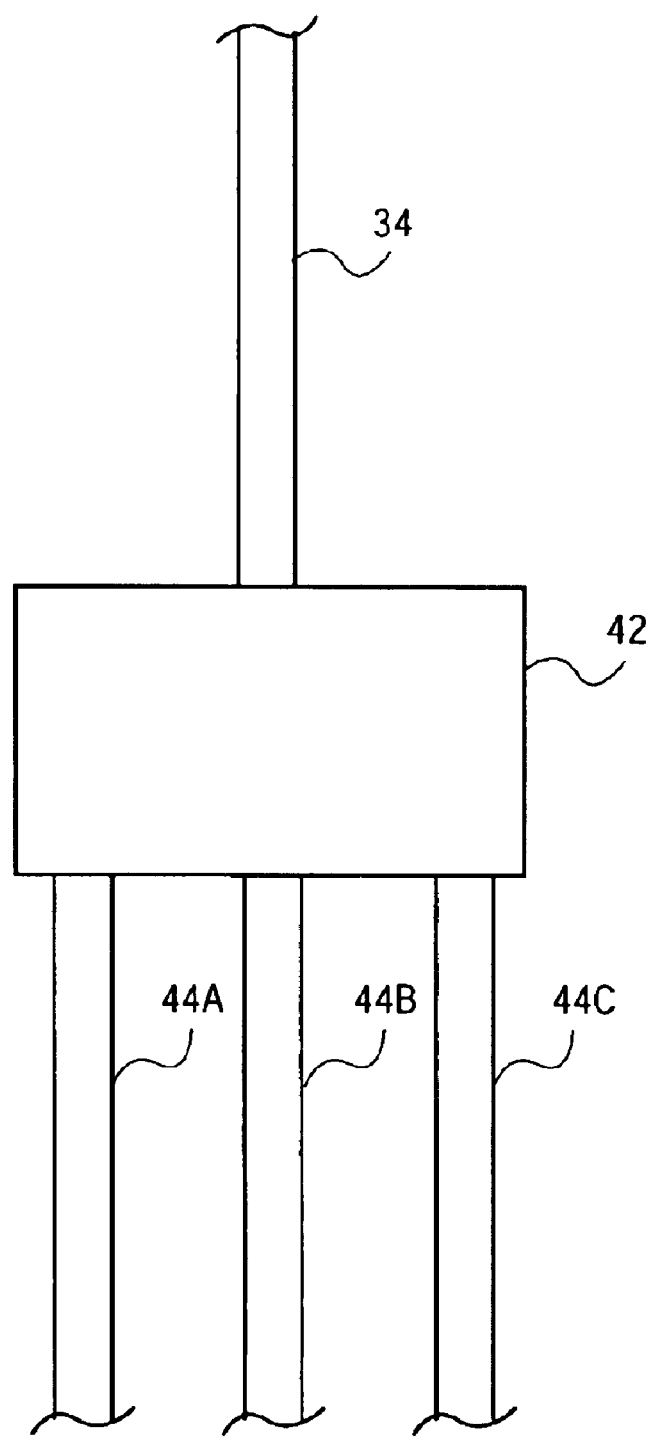
FIG. 5 shows one embodiment of a tension splitter that may be used as part of a cable system to actuate a plurality of braking mechanisms.

Regardless of the type of braking mechanisms used to control movement in the various directions, it is contemplated to have a single cable that a user can manipulate in order to control multiple braking mechanisms. FIG. 5 shows one embodiment of a cable system that can actuate a plurality of braking mechanisms associated with the movement of a seat assembly. For example, tension splitter 42 may be coupled to cable 34 such that the tension applied by the user with handle 32 (FIG. 3) is divided among two or more cables (e.g. 44A, 44B, and 44C) to control different braking mechanisms. In one embodiment, cable 44A could be coupled to the braking mechanism to control fore and aft movement; cable 44B could be coupled to the braking mechanism to control transverse movement; and cable 44C could be coupled to the braking mechanism to control rotational movement.

The embodiments disclosed herein may be used in combination with a vehicle such as, for example, an aircraft, a watercraft, or a land vehicle. FIG. 3 shows one example of how base assembly 24 may be coupled to a portion of a vehicle (e.g., floor 23).

Although the preceding embodiments have been focused on the use of a caliper to effect a braking force on a disc or a ring, there are other alternative embodiments that may be used. For example, various embodiments may include a band that is disposed around the circumference of the disc (or ring) such that the band is biased to apply a frictional force to the disc to prevent rotational movement. The disc may also have a circumferential recess in which the band is disposed. The recess helps the band remain engaged with the disc. When a user wishes to rotate the seat, the user can actuate a cable to reduce to amount of braking force (e.g., friction) exerted on the disc. Similar to the other embodiments, the user may allow the cable to return to the biased position, in which the band tightens around the disc to prevent rotational movement.

In another alternative embodiment, a drum assembly may be used in place of a brake disc, and a brake shoe assembly may be used in place of a caliper. In operation, at least one brake shoe is biased against the inner and/or the outer surface of the drum assembly. As described above, various embodiments may include a cable to permit a user to reduce the braking force applied to the drum assembly, allowing the seat to rotate. Once the user has chosen a desired rotational orientation, the cable may be released so that the braking mechanism returns to the biased state in which the brake shoe assembly applies enough braking force to prevent rotational movement of the seat.

It is to be understood that even though numerous characteristics and advantages of various embodiments have been set forth in the foregoing description, together with details of structure and function of the various embodiments, this disclosure is illustrative only. Changes may be made in detail, especially matters of structure and management of parts, without departing from the scope of the various embodiments as expressed by the broad general meaning of the terms of the appended claims.

We claim:

1. An apparatus comprising:
   a circular member;
   a seat assembly rotatably coupled to the circular member; and
   a caliper, that when engaged, applies a braking force against at least one of a top side and a bottom side of the circular member, the force to prevent rotation of the circular member.

2. The apparatus of claim 1, wherein the circular member comprises:
   one of a ring and a disc.

3. The apparatus of claim 2, wherein the circular member is fixedly coupled to a base assembly and the caliper is movable with the seat assembly.

4. The apparatus of claim 1, wherein the caliper comprises:
   a first resilient member to bias a braking element against at least one of a top side and a bottom side of the circular member.

5. The apparatus of claim 4, wherein the first resilient member comprises:
a spring.

6. The apparatus of claim 4, further comprising:
a second adjustable resilient member to adjust the braking force exerted on the circular member by the caliper in a biased state.

7. An apparatus comprising:
a circular member;
a seat assembly rotatably coupled to the circular member; and
a caliper, that when engaged, applies a braking force to the circular member, the force to prevent rotation of the circular member, wherein the caliper comprises:
a first resilient member that biases a braking element against at least one of a top side and a bottom side of the circular member;
a second adjustable resilient member that adjusts the braking force exerted on the circular member by the caliper in a biased state, wherein the second adjustable resilient member comprises a spring.

8. The apparatus of claim 1, further comprising:
a cable coupled to the caliper, the cable to enable a user to reduce the braking force applied to the circular member such that the seat assembly may be rotated.

9. The apparatus of claim 8, wherein the cable is part of a cable system that can actuate a plurality of braking mechanisms associated with the movement of the seat assembly.

10. An apparatus comprising:
a circular member;
a seat assembly rotatably coupled to the circular member;
a caliper, that when engaged, applies a braking force to the circular member, the force to prevent rotation of the circular member; and
a cable coupled to the caliper, the cable enabling a user to reduce the braking force applied to the circular member such that the seat assembly may be rotated, wherein the cable is part of a cable system that actuates a plurality of braking mechanisms associated with the movement of the seat assembly, and wherein the cable system comprises a tension splitter coupled to the cable and the caliper.

11. An apparatus for use in combination with a vehicle, the combination comprising:
a circular member;
a seat assembly rotatably coupled to the circular member; and
a caliper, that when engaged, applies a braking force against at least one of a top side and a bottom side of the circular member, the force to prevent rotation of the circular member, wherein at least one of the circular member and the caliper are coupled to a portion of the vehicle.

12. The combination of claim 11, wherein the vehicle comprises:
at least one of an aircraft, a watercraft, and a land vehicle.

13. The combination of claim 11, wherein the circular member comprises:
one of a ring and a disc.

14. The combination of claim 13, wherein the circular member is fixedly coupled to a base assembly and the caliper is movable with the seat assembly.

15. The combination of claim 11, wherein the caliper comprises:
a first resilient member to bias a braking element against at least one of a top side and a bottom side of the circular member.

16. The combination of claim 15, wherein the first resilient member comprises:
a spring.

17. The combination of claim 15, further comprising:
a second adjustable resilient member to adjust the braking force exerted on the circular member by the caliper in a biased state.

18. An apparatus for use in combination with a vehicle, the combination comprising;
a circular member;
a seat assembly rotatably coupled to the circular member; and
a caliper, that when engaged, applies a braking force to the circular member, the force to prevent rotation of the circular member, wherein at least one of the circular member and the caliper are coupled to a portion of the vehicle, wherein the caliper comprises:
a first resilient member that biases a braking element against at least one of a top side and a bottom side of the circular member; and
a second adjustable resilient member that adjusts the braking force exerted on the circular member by the caliper in a biased state, wherein the second adjustable resilient member comprises a spring.

19. The combination of claim 11, further comprising:
a cable coupled to the caliper, the cable to enable a user to reduce the braking force applied to the circular member such that the seat assembly may be rotated.

20. The combination of claim 19, wherein he cable is part of a cable system that can actuate a plurality of braking mechanisms associated with the movement of the seat assembly.

21. An apparatus for use in combination with a vehicle, the combination comprising:
a circular member;
a seat assembly rotatably coupled to the circular member; and
a caliper, that when engaged, applies a braking force to the circular member, the force to prevent rotation of the circular member, wherein at least one of the circular member and the caliper are coupled to a portion of the vehicle;
a cable coupled to the caliper, the cable enabling a user to reduce the braking force applied to the circular member such that the seat assembly may be rotated, wherein the cable is part of a cable system that actuates a plurality of braking mechanisms associated with the movement of the seat assembly, and wherein the cable system comprises a tension splitter coupled to the cable and the caliper.

* * * * *